Figure 4:
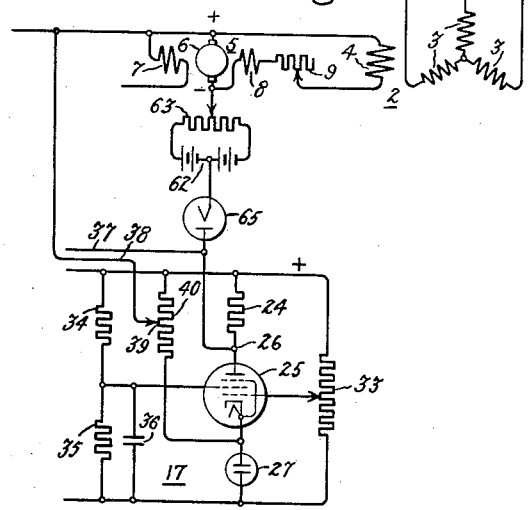

July 23, 1940.  E. E. MOYER  2,209,233
ELECTRIC CONTROL CIRCUIT
Filed Sept. 30, 1938  2 Sheets-Sheet 1
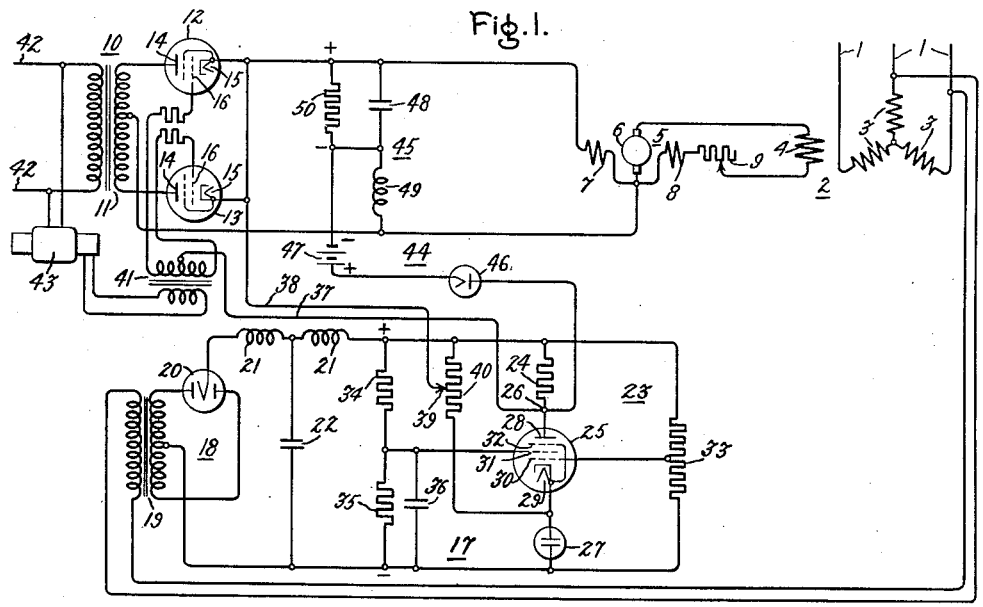
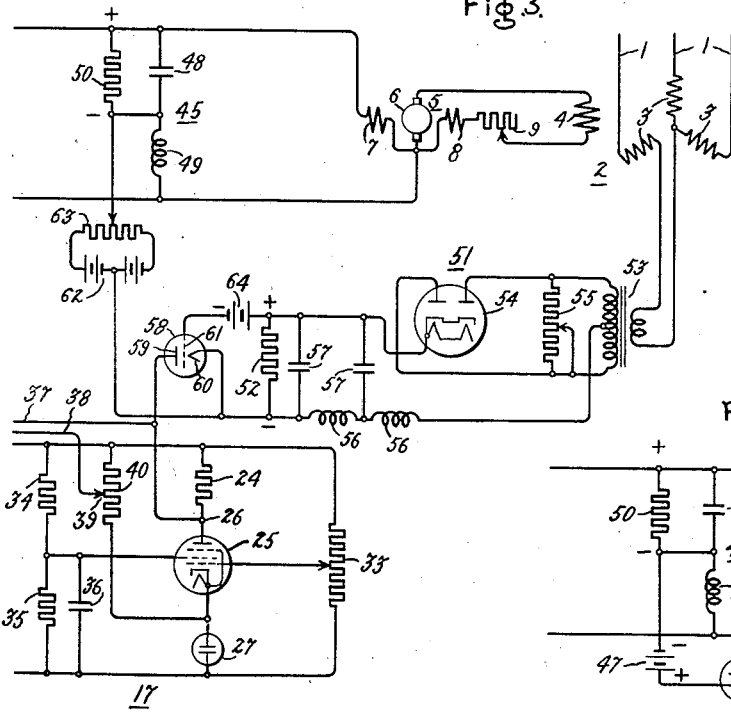
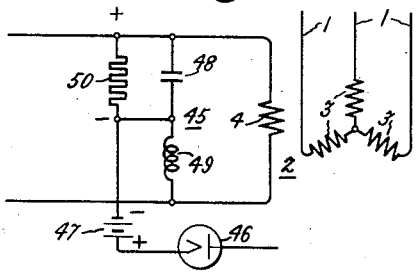
Inventor:
Elmo E. Moyer,
by Harry E Dunham
His Attorney.

Inventor:
Elmo E. Moyer,
by Harry E. Dunham
His Attorney.

Patented July 23, 1940

2,209,233

UNITED STATES PATENT OFFICE 2,209,233

ELECTRIC CONTROL CIRCUIT

Elmo E. Moyer, Scotia, N. Y., assignor to General Electric Company, a corporation of New York Application September 30, 1938, Serial No. 232,601

9 Claims. (Cl. 171—119)

My invention relates to electric control circuits and more particularly to improvements in electric valve control systems for dynamo-electric machines such as disclosed and claimed in a copending patent application Serial No. 232,598 of E. E. Moyer and O. W. Livingston and which is assigned to the assignee of the present application.

Electric valve apparatus has been found highly desirable for use in electric regulating systems where precision of control and rapidity of response are required. For example, in the regulation and control of dynamo-electric machines, electric valve apparatus responds quickly to variable load or operating conditions to control electric translating apparatus in a highly satisfactory manner. In the control of synchronous alternating current machines where stability of operation is important, electric valve apparatus has been employed to control operating conditions such as the voltage of dynamo-electric machines. In some applications it is preferable to employ electric valve means for controlling an exciter which in turn controls the main associated dynamo-electric machine. For example, in the control of synchronous condensers of large size or rating, it is desirable to employ an auxiliary dynamo-electric machine, such as an exciter, and to use electric valve apparatus as a means for variably energizing a field winding of the exciter. In accordance with the teachings of my invention described hereinafter, I provide new and improved electric valve control circuits for controlling the operation of dynamo-electric machines.

It is an object of my invention to provide new and improved electric valve control systems.

It is another object of my invention to provide new and improved electric valve control systems for dynamo-electric machines.

It is a further object of my invention to provide new and improved voltage regulating systems for dynamo-electric machines.

In accordance with the illustrated embodiments of my invention, I provide new and improved electric valve regulating systems for controlling an electrical condition, such as the voltage, of an alternating current circuit by controlling the operation of an associated dynamo-electric machine. The dynamo-electric machine may be a part of electric translating apparatus which controls the voltage of the system, such as a synchronous condenser which is connected to the alternating current circuit. An auxiliary dynamoelectric machine or an exciter variably energizes a field winding of the synchronous condenser, and a field winding of the exciter is variably energized by electric valve rectifying apparatus. The electric valve rectifying apparatus may be of the type employing a control member on which there is impressed a control voltage which varies in accordance with the electrical condition to be regulated. I employ a voltage controlling circuit comprising a rectifier which produces a unidirectional voltage which varies in accordance with the voltage of the associated alternating current circuit, and which also includes a serially-connected impedance element and an electronic discharge device which impresses on the control member the variable control voltage. In order to limit the excitation of the synchronous condenser or to limit the excitation of the exciter, I provide means which is responsive to an electrical condition of the exciter or an electrical condition of the synchronous condenser to control the voltage appearing across the terminals of the impedance element, thereby preventing excessive overload and incident heating of the synchronous condenser. I employ the voltage of one of the windings of the exciter, such as the field winding or the armature winding, to obtain selective control of the voltage controlling circuit in accordance with the power factor of the current transmitted by the armature windings of the synchronous condenser. Of course, when the synchronous condenser is operating in the leading region, the excitation of the synchronous condenser is high and the voltage appearing across the terminals of the synchronous condenser field winding or the field winding of the exciter is correspondingly large, and this voltage is utilized as an indicant of the amount of leading reactive voltamperes being transmitted by the synchronous condenser.

In accordance with another feature of the illustrated embodiments of my invention, I provide improved coupling circuits for use in systems of the above described nature, whereby the exciter for the synchronous condenser field winding is coupled to the voltage controlling circuit or to a current responsive circuit.

Figure 5:
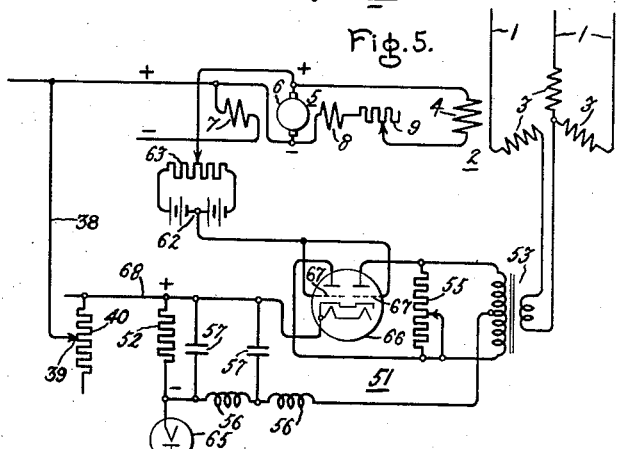
Figure 6:
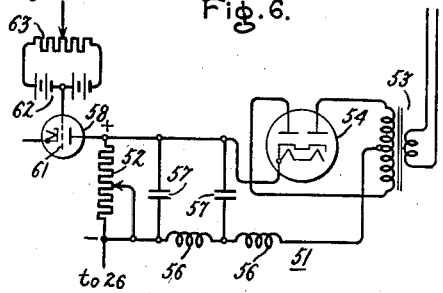

For a better understanding of my invention, reference may be had to the following description taken in connection with the accompanying drawings, and its scope will be pointed out in the appended claims. Fig. 1 of the accompanying drawings diagrammatically illustrates an embodiment of my invention as applied to a synchronous condenser, and Fig. 2 represents a modification of the arrangement shown in Fig. 1. Fig. 3 represents diagrammatically another embodiment of my invention in which the voltage of the field winding of the exciter is employed as an indicant of the current and power factor of the associated synchronous condenser and in which the system is provided with a current responsive circuit which is coupled to a controlled electric valve means which effects transfer of the control from the voltage controlling circuit to the current responsive circuit. Fig. 4 shows another modification of my invention in which the armature voltage of the exciter is employed as an indicant of the magnitude of the armature current and as an indicant of the power factor of an associated synchronous condenser. Figs. 5 and 6 represent certain operating conditions of the arrangement of Fig. 4 in which a current responsive circuit is associated with the system.

Referring now more particularly to the arrangement of Fig. 1, my invention is there represented as applied to a control system for controlling an electrical condition, such as the voltage, of an alternating current circuit 1. Electric translating apparatus may be associated with the system to control the voltage and may comprise a synchronous condenser 2 including armature windings 3 and an excitation or field winding 4. To variably energize the field winding 4, I employ a suitable arrangement, such as an auxiliary dynamo-electric machine, which may be an exciter 5 having an armature winding 6, a shunt field winding 7 and a series field winding 8 which may be connected to the field winding 4 through a current controlling device such as an adjustable resistance 9.

I provide a circuit 10 which transmits variable amounts of unidirectional current to the field winding 7 of exciter 5 to control the excitation thereof and to control the excitation and voltage of the synchronous condenser 2. The circuit 10 may comprise a transformer 11 and electric valve means 12 and 13, which are preferably of the type employing an ionizable medium such as a gas or a vapor and each of which includes an anode 14, a cathode 15, and a control member or grid 16.

There is provided a voltage responsive or controlling circuit 17 which controls the conductivities of the electric valves 12 and 13 in accordance with an electrical condition, such as the voltage, of the alternating current circuit 1. Circuit 17 comprises a rectifier circuit 18 including a transformer 19 and a suitable unidirectional conducting device such as an electric valve 20 which produces a variable unidirectional voltage in accordance with the voltage of the alternating current circuit 1. A filter circuit comprising inductances 21 and a capacitance 22 is connected across the output circuit of the rectifier 18 to absorb undesirable harmonic components which may be present in the rectified output.

I employ a circuit 23 which is disclosed and claimed in my co-pending patent application Serial No. 232,599 filed concurrently herewith and assigned to the assignee of the present application. Circuit 23 produces a variable voltage which is impressed on the control grids 16 of the electric valves 12 and 13 and controls the conductivities thereof in accordance with the voltage of circuit 1. Circuit 23 comprises a serially connected impedance element 24 and an electronic discharge device 25, joined at juncture 26. The impedance element 24 and discharge device 25 are energized from the output circuit of the rectifier 18 and are connected in series relation with a suitable constant voltage device such as a glow discharge valve 27. The electronic discharge device 25 is preferably of the high vacuum type having an anode 28, a cathode 29, a control grid 30, a screen grid 31 which is employed as a second control grid, and a suppressor grid 32 which is connected to the cathode. The entire increment or decrement of voltage of the output circuit of rectifier 18 is impressed on the control grid 30 by virtue of the fact that the control grid is energized from a voltage divider 33 which is also connected across the output circuit of rectifier 18 and by virtue of the fact that the constant voltage glow discharge valve 27 is connected to maintain the cathode 29 at a fixed potential above that of the negative terminal of the rectifier 18. A predetermined component of the voltage of the output circuit of rectifier 18 is impressed on the screen grid 31 by a second voltage divider comprising serially connected resistances 34 and 35. A capacitance 36 may be connected across the resistance 35 to absorb extraneous transient voltages which may be present in the system. An output circuit connected to circuit 23 and which comprises conductors 37 and 38 is connected between the common juncture 26 and a point 39 of a resistance 40 which is connected between the positive terminal of the output circuit of rectifier 18 and the common juncture of the electronic discharge device 25 and the glow discharge valve 27.

Conductor 38 of the output circuit is connected to the cathodes 15 of the electric valves 12 and 13 and conductor 37 is connected to the control grids 16 of these valves through a secondary winding of transformer 41 which impresses on the control members voltages of predetermined phase displacement relative to the anode-cathode voltages. The two control member voltages are preferably displaced 90 electrical degrees in a lagging direction relative to the anode-cathode voltages. Transformers 11 and 41 may be energized from any suitable source of alternating current 42 and, if desired, may be connected to the alternating current circuit 1. Transformer 41 may be energized from any suitable source of alternating current of proper phase displacement and in the arrangement illustrated is shown as being connected to circuit 42 through a suitable phase shifting arrangement such as a rotary phase shifter 43.

As a means for controlling the excitation of the synchronous condenser 2 in accordance with current and power factor, I provide a circuit 44 including a voltage divider 45, a unidirectional conducting device such as an electric valve 46, and a source of unidirectional biasing voltage such as a battery 47. The voltage divider may comprise a capacitance 48, an inductance 49 and a resistance 50 which is connected across the capacitance 48. The voltage divider 45 may be connected across the field winding 7 or the armature winding 6. The battery 47 is poled opposite to the voltage drop across resistance 50, and the electric valve 46 is connected in the circuit in a manner to permit flow of current from the impedance element 24 when the voltage appearing across resistance 50 attains a predetermined value, in this manner limiting the minimum negative unidirectional voltage which may appear across the terminals of the impedance element 24 and thereby limiting the maximum excitation of the synchronous condenser 2.

The operation of the embodiment of my invention shown in Fig. 1 will be explained by considering the system when the condenser 2 is operating to supply variable amounts of leading or lagging reactive volt-amperes to the alternating current circuit 1. The synchronous condenser 2 supplies variable amounts of current to maintain the voltage of circuit 1 substantially constant within predetermined ranges. The voltage responsive circuit 17 operates to control the voltage impressed on the control grids 16 of electric valves 12 and 13. These electric valves transmit variable amounts of unidirectional current to the field winding 7 of exciter 5, which in turn transmits variable amounts of unidirectional current to the field winding 4 of synchronous condenser 2 to control the voltage thereof.

The voltage responsive circuit 17 varies the voltage appearing across conductors 37 and 38 by virtue of the fact that the electronic discharge device 25 conducts variable amounts of unidirectional current through the impedance device 24. Due to the fact that the electronic discharge device 25 is controlled by means of two control members on which the variable output voltage of rectifier circuit 18 is effective, circuit 23 effects precise and accurate control of the voltage of circuit 1.

So long as the current transmitted by armature winding 3 of synchronous condenser 2 does not exceed a predetermined value, circuit 17 operates to maintain the voltage of circuit 1 substantially constant. However, if the current transmitted by the armature windings 3 tends to exceed a predetermined value in the leading region of operation, the minimum voltage appearing across the terminals of the impedance element 24 is limited by the circuit 44 to prevent the current from exceeding that value and thereby prevents overload or excessive heating of the synchronous condenser. The voltage appearing across the field winding 7 of exciter 5, and hence the voltage appearing across the resistance 50, is employed as an indicant of the amount of leading volt-amperes transmitted by the synchronous condenser 2. Of course, it will be understood by those skilled in the art that the excitation of the synchronous condenser 2 is materially greater within the leading region of operation than in the lagging region, if the terminal voltage is to be maintained constant, and hence the voltage of field winding 4 and the voltage of field winding 7 will be substantially greater in the leading region of operation than in the lagging region of operation. When the voltage appearing across the resistance 50 attains a value sufficient to cause electric valve 46 to conduct current by overcoming the effect of the battery 47, the voltage of the impedance element 24 will be limited to a predetermined minimum negative value. In this manner, the maximum excitation of the exciter 5 and the synchronous condenser 2 is fixed.

In many applications it is desirable to permit the synchronous condenser to transmit a larger amount of lagging reactive volt-amperes than leading reactive volt-amperes because of the permissible increase of armature current in the lagging region due to the decreased field heating. The arrangement of my invention shown in Fig. 1 permits such operation inasmuch as the circuit 44 does not come into operation within the lagging region of operation.

Fig. 2 diagrammatically illustrates another embodiment of my invention in which the voltage appearing across the terminals of the field winding 4 of the synchronous condenser 2 is employed as a reference to control the current, voltage, and power factor conditions of the synchronous condenser 2.

Fig. 3 diagrammatically illustrates a modification of my invention which is similar in many respects to that shown in Fig. 1, and corresponding elements have been assigned like reference numerals. I employ a current responsive circuit 51 which produces across the terminals of an adjustable impedance element, such as a resistance 52, a unidirectional voltage which varies in accordance with the current transmitted by the armature windings 3 or in accordance with the current of alternating current circuit 1. The current responsive circuit 51 comprises a current transformer 53 and a suitable rectifying device such as an electric valve 54 which may be of the controlled type or of the uncontrolled type. A suitable adjustable impedance, such as an adjustable resistance 55, is connected across the terminals of the secondary winding of transformer 53 to adjust the range within which the voltage of resistance 52 varies. A filter circuit comprising inductances 56 and capacitances 57 is connected across the output circuit of electric valve 54 to absorb undesirable harmonic components of voltage.

I provide a transfer electric valve 58 which is connected between the voltage responsive circuit 17 and the current responsive circuit 51 to effect transfer of control from the voltage responsive circuit 17 to the current responsive circuit 51 when the armature current of the synchronous condenser 1 tends to exceed a predetermined value in the leading region of operation. The electric valve 58 is of the controlled type and is preferably of the high vacuum type having an anode 59, a cathode 60 and a control grid 61. The anode 59 is connected to the common juncture 26, and the cathode 60 is connected to the negative terminal of the resistance 50 through a suitable source of adjustable unidirectional voltage which may comprise a battery 62 and a voltage divider 63. A battery 64 is employed to impress on the control member 61 a negative unidirectional biasing potential which tends to oppose the unidirectional voltage appearing across the terminals of resistance 52.

The general principles of operation of the embodiment of my invention shown in Fig. 3 are substantially the same as that explained above in connection with the arrangement of Fig. 1. So long as the current of condenser 2 remains within a predetermined range of values in the leading and lagging regions, the voltage of circuit 1 is maintained substantially constant by means of the condenser 2 and the voltage controlling circuit 17. However, if the current tends to exceed a predetermined value in the leading region of operation, the voltage appearing across the resistance 52 rises sufficiently to overcome the effect of battery 64, thereby rendering the electric valve 58 conductive and limiting the voltage appearing across the terminals of impedance element 24. Of course, this action does not take place until the voltage appearing across the resistance 50 increases sufficiently to lower the potential of the cathode 60 of electric valve 58 to cause the electric valve to conduct current. This condition obtains only in the leading region of operation since in the lagging region the voltage across resistance 50 is materially reduced; that is, this voltage is much less than that required to overcome the effect of the battery 62 and voltage divider 63. In other words, to render the transfer valve 58 conductive a concurrence of two conditions is required; that is, the voltage appearing across the terminals of resistance 52 must have attained a predetermined value, and the voltage appearing across the resistance 50 must also have attained a definite value. It is to be understood that by virtue of the circuit of Fig. 3, the system is selectively responsive to the current and power factor of the alternating current circuit 1 or of the synchronous condenser 2.

The arrangement of Fig. 4 is similar to the arrangement of Fig. 3 and corresponding elements have been assigned like reference numerals. In the arrangement of Fig. 4, a transfer means, such as a unidirectional conducting device or electric valve 65, is connected between the battery 62 and voltage divider 63 and the common juncture 26 to limit the voltage of the impedance element 24 and hence to limit the excitation of the synchronous condenser 2 when the current tends to exceed a predetermined value in the leading region of operation. The circuit may be arranged to be responsive to the voltage of armature 6 of the exciter 5. Since the armature voltage is greater within the leading region of operation, the system responds selectively to the power factor of circuit 1 or the power factor of the armature current of synchronous condenser 2.

In Fig. 5 there is shown another modification of my invention in which the current responsive circuit is provided with an electric valve 66 of the controlled type. The electric valve 66 is preferably of the high vacuum type and may comprise a pair of electronic discharge paths each having a control grid 67. The control grids 67 are connected to be responsive to the voltage of the armature winding 6 of exciter 5 and are connected to the armature winding 6 through voltage divider 63 and battery 62. The positive terminal of resistance 52 is connected to the positive terminal of the voltage controlling circuit 17 through a conductor 68. The negative terminal of the resistance 52 is connected to the common juncture 26 through electric valve 65.

The operation of the embodiment of my invention shown in Fig. 5 is substantially the same as that explained above. When the current tends to exceed a predetermined value in the leading region of operation, the armature voltage of exciter 5 attains a value sufficient to overcome the effect of battery 62 to render the electric valve 66 conductive, and the voltage appearing across the terminals of resistance 52 is sufficient to cause electric valve 65 to conduct current and thereby limit the magnitude of the voltage appearing across the terminals of impedance element 24. The concurrence of these two voltage conditions is an indicant of the current and power factor transmitted by the armature windings 3 and serves to limit the excitation of the synchronous condenser 2. Of course, it is to be understood that in the lagging region of operation, since the voltage of the armature winding 6 is not large enough to render the electric valve 66 conductive, the current limiting operation is not brought into effect.

Fig. 6 diagrammatically illustrates a still further embodiment of my invention in which the circuit 51 comprises an uncontrolled electric valve 54 and controls the conductivity of the transfer electric valve 58 in an arrangement such as that shown in Fig. 5. The control grid 61 of the electric valve 58 is energized in accordance with the armature voltage of exciter 5 and renders the electric valve 58 conductive when the armature voltage exceeds a predetermined value. The negative terminal of resistance 52 is connected to the common juncture 26 and upon the concurrence of a predetermined current condition and a leading power factor condition, the system serves to limit the voltage appearing across the terminals of the impedance element 24 to maintain a substantially constant current in the system.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a dynamo-electric machine having an armature winding and a field winding, an exciter having an armature winding connected to said field winding and having a field winding, means for energizing the field winding of said exciter comprising a source of alternating current and electric valve means having a control member, voltage controlling means for impressing on said control member a voltage which varies in response to the voltage of said armature winding, and unidirectional conducting means responsive to an electrical condition of one of the windings of said exciter for controlling said voltage controlling means to distinguish between leading and lagging current transmitted by the armature of said machine.

2. In combination, a synchronous condenser having an armature winding and a field winding, an exciter having an armature winding connected to said field winding and having a field winding, means for energizing the field winding of said exciter comprising a source of alternating current and electric valve means having a control member, voltage controlling means for impressing on said control member a voltage which varies in response to the voltage of said armature winding, and unidirectional conducting means responsive to an electrical condition of one of the windings of modifying the variable voltage to limit the maximum energization of the field winding of said condenser within the leading current region of operation.

3. In combination, an alternating current circuit, electric translating apparatus for controlling the voltage of said circuit and comprising a dynamo-electric machine having an armature winding and a field winding, electric valve means for controlling the energization of said field winding and comprising a control member for controlling the conductivity thereof, a voltage responsive circuit comprising a rectifier for producing a unidirectional voltage which varies in accordance with the voltage of said alternating current circuit and a serially-connected impedance element and an electronic discharge device connected to be energized from said rectifier for impressing on said control member a control voltage, and means responsive to the energization of said field winding for limiting the voltage appearing across the terminals of said impedance element.

4. In combination, an alternating current circuit, electric translating apparatus for controlling the voltage of said circuit and comprising a dynamo-electric machine having an armature winding and a field winding, electric valve means for controlling the energization of said field winding and comprising a control member for controlling the conductivity thereof, a voltage responsive circuit comprising a rectifier for producing a unidirectional voltage which varies in accordance with the voltage of said alternating current circuit and a serially-connected impedance element and an electronic discharge device connected to be energized from said rectifier for impressing on said control member a control voltage, and means for limiting the voltage of said impedance element comprising a voltage divider connected across said field winding and a unidirectional conducting device connected between said impedance element and said voltage divider.

5. In combination, an alternating current circuit, electric translating apparatus for controlling the voltage of said circuit and comprising a dynamo-electric machine having an armature winding and a field winding, electric valve means for controlling the energization of said field winding and comprising a control member for controlling the conductivity thereof, a voltage responsive circuit comprising a rectifier for producing a unidirectional voltage which varies in accordance with the voltage of said alternating current circuit and a serially-connected impedance element and an electronic discharge device connected to be energized from said rectifier for impressing on said control member a control voltage, a current responsive circuit comprising a resistance and a rectifier for producing across said resistance a voltage which varies in accordance with the current of said alternating current circuit, and means for controlling the energization of said field winding comprising a voltage divider connected across said field winding and a controlled electric valve connected between said current responsive circuit and said impedance element.

6. In combination, an alternating current circuit, electric translating apparatus for controlling the voltage of said circuit and comprising a dynamo-electric machine having an armature winding and a field winding, electric valve means for controlling the energization of said field winding and comprising a control member for controlling the conductivity thereof, a voltage responsive circuit comprising a rectifier for producing a unidirectional voltage which varies in accordance with the voltage of said alternating current circuit and a serially-connected impedance element and an electronic discharge device connected to be energized from said rectifier for impressing on said control member a control voltage, a current responsive circuit comprising a resistance and a rectifier for producing across said resistance a unidirectional voltage which varies in accordance with the current of said alternating current circuit, and means for effecting transfer of control from said voltage responsive circuit to said current responsive circuit when the energization of said field winding tends to exceed a predetermined value and comprising a voltage divider connected across said field winding, a controlled electric valve means having a grid and means responsive to the voltage across said resistance for energizing said grid.

7. In combination, an alternating current circuit, electric translating apparatus for controlling the voltage of said circuit and comprising a dynamo-electric machine having an armature winding and a field winding, electric valve means for controlling the energization of said field winding and comprising a control member for controlling the conductivity thereof, a voltage responsive circuit comprising a rectifier for producing a unidirectional voltage which varies in accordance with the voltage of said alternating current circuit and a serially-connected impedance element and an electronic discharge device connected to be energized from said rectifier for impressing on said control member a control voltage, a current responsive circuit comprising a resistance and a rectifier for producing across said resistance a unidirectional voltage which varies in accordance with the current of said alternating current circuit, and means for effecting transfer of control from said voltage responsive circuit to said current responsive circuit when the voltage of said armature winding tends to exceed a predetermined value and comprising a unidirectional conducting device connected between said current responsive circuit and said voltage responsive circuit.

8. In combination, an alternating current circuit, electric translating apparatus for controlling the voltage of said circuit and comprising a dynamo-electric machine having an armature winding and a field winding, means for controlling the energization of said field winding and comprising an electric valve means having a control member for controlling the conductivity thereof, a voltage responsive circuit comprising a rectifier for producing a unidirectional voltage which varies in accordance with the voltage of said alternating current circuit and a serially-connected impedance element and an electronic discharge device connected to be energized from said rectifier for impressing a control voltage on said control member, a current responsive circuit comprising a resistance and a controlled electric valve means for producing across said resistance a unidirectional control voltage, said last mentioned electric valve means having a grid, a unidirectional conducting device connected between said impedance element and said resistance, and means responsive to an electrical condition of one of said windings for energizing said grid.

9. In combination, an alternating current circuit, electric translating apparatus for controlling the voltage of said circuit and comprising a dynamo-electric machine having an armature winding and a field winding, means for controlling the energization of said field winding and comprising an electric valve means having a control member for controlling the conductivity thereof, a voltage responsive circuit comprising a rectifier for producing a unidirectional voltage which varies in accordance with the voltage of said alternating current circuit and a serially-connected impedance element and an electronic discharge device connected to be energized from said rectifier for impressing a control voltage on said control member, a current responsive circuit comprising a resistance and a controlled electric valve means for producing across said resistance a unidirectional control voltage, said last mentioned electric valve means having a grid, a unidirectional conducting device connected between said impedance element and said resistance, and means responsive to the voltage of said armature winding for energizing said grid to render said last mentioned electric valve means conductive to limit the voltage appearing across the terminals of said impedance element.

ELMO E. MOYER.

CERTIFICATE OF CORRECTION.

Patent No. 2,209,233.                                           July 23, 1940.

ELMO E. MOYER.

It is hereby certified that error appears in the printed specification of the above numbered patent requiring correction as follows: Page 3, second column, line 73, for "ohter" read --other--; page 4, second column, line 48, claim 2, after the word "of" insert --said exciter for--; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.